UNITED STATES PATENT OFFICE.

ALFRED CONZETTI, OF BASEL, SWITZERLAND, ASSIGNOR TO ANILINE COLOUR AND EXTRACT WORKS, FORMERLY JOHN R. GEIGY, OF BASEL, SWITZERLAND.

TRIPHENYLMETHANE DYE AND PROCESS OF MAKING SAME.

No. 877,052.  Specification of Letters Patent.  Patented Jan. 21, 1908.

Application filed August 1, 1907. Serial No. 386,623.

*To all whom it may concern:*

Be it known that I, ALFRED CONZETTI, doctor of philosophy, chemist, a citizen of the Swiss Republic, and residing at Basel, Switzerland, have invented certain new and useful Improvements in Mordant-Dyeing Coloring-Matters of the Triphenylmethane Series, of which the following is a specification.

My present invention relates to the production of new triphenylmethane dye-stuffs adapted to be afterwards treated with bichromate, by condensing orthosulfo-benzaldehyde and its derivatives of the general formula

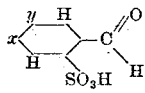

($x$ and $y$ representing hydrogen atoms which can be replaced by halogen, the nitro-, sulfo- or methyl group) for instance: ortho-sulfo-benzaldehyde $CHO:SO_3H = 1:2$).

chlorothosulfo-benzaldehyde $(CHO:SO_3H:Cl = 1:2:4$ and $1:2:5)$ nitroörthosulfo-benzaldehyde $(CHO:SO_3H:NO_2 = 1:2:4$ and $1:2:5)$ disulfobenzaldehyde $(CHO:SO_3H:SO_3H = 1:2:4$ and $1:2:5)$ disulfomethyl-benzaldehyde $(CHO:SO_3H:CH_3 = 1:2:4:5)$ and the like with aromatic oxycarbonic acids such as orthocresotinic acid or salicylic acid and by oxidizing the thus produced leuco compounds in presence of concentrated sulfuric acid by means of bodies containing nitro genoxids, such as nitrous acid, nitric acid or aromatic nitrocompounds.

In carrying out my process I can proceed in two different ways: Either a solution of orthosulfo-benzaldehyde in diluted sulfuric acid of 50 per cent. is boiled with the aromatic oxycarbonic acid, and then the leuco compound thus formed is separated in dry form and transformed into the dyestuff by a subsequent oxidation by means of a solution of nitrous or nitric acid or an aromatic nitro compound in concentrated sulfuric acid; or what has been proved to be more advantageous in most cases to accomplish the condensation and oxidation in the same solution of concentrated sulfuric acid without isolating the leuco compound.

The following examples will serve to further illustrate the manner in which the new coloring matters can be obtained in practice, but my invention is not limited to these examples.

Example I: 21 kilos of the sodium salt of ortho-sulfobenzaldehyde are dissolved in 150 kilos of sulfuric acid of 50 per cent. and boiled with 31 kilos of orthocresotinic acid for twelve hours, using a reflux cooler, at a temperature of 120–125° C. The leuco body will then have separated as a mass of small knobs tinted reddish and is filtered off, purified by dissolving in water and precipitated with common salt. When dried, it is a powder slightly reddish, easily soluble in water, alcohol and glacial acetic acid, but almost insoluble in benzene and chloroform.

The leuco compound will behave towards oxidizing agents as follows. Peroxid of lead and chloranil show neither in acid nor in alcoholic solution any color reaction, whereas bichromate of potassium in acid solution will react quite singularly: The solution will turn slowly red in the cold and quickly red, when heated, then violet and lastly blue, evidently meanwhile forming a lake.

For oxidation on a large scale nitrosylsulfuric acid may be adopted with advantage, the method being as follows: 7 kilos of nitrite of sodium are added by degrees and while stirring to 150 kilos of concentrated sulfuric acid. After all is well dissolved, the warm solution is cooled down to 20° C. and 47.3 kilos of the leuco compound are slowly added while the last mentioned temperature is maintained. The melt soon turns red and the oxidation is finished within twenty-four hours. This product is introduced into 150 liters of water, when the coloring matter will separate tinted a bright red; it is then filtered off, dissolved in water and precipitated again by means of common salt. When dried it presents a red powder, easily soluble in water with an orange-red and in diluted caustic soda lye with a violet color, which when acidulated, again turns into an orange-red. The solution is concentrated sulfuric acid is likewise orange-red and diluted with a little water will separate the coloring matter in red flakes which however, will again dissolve if dilution is continued on a liberal scale. Ammonia will deepen the orange-red aqueous solution into a brownish-red.

The dyestuff dyes wool in an acidulated bath a bright red and aftertreated with bichromate of potassium a brilliant and pure violet-blue. The same violet blue shades are produced by dyeing chrome mordanted wool. The new dyestuff can also be used for printing on cotton when mixed with a chrome salt. The chrome dyeings excel in very good fastness to milling as well as in a fastness to light hitherto unknown with colors of the triphenylmethane-series.

Example II. 296 liters of a solution of 2-4-disulfobenzaldehyde of 9 per cent. are evaporated to dryness and the remaining dry mass dissolved in 140 kilos of concentrated sulfuric acid. A solution of 20.3 kilos of m-nitrobenzene-sulfonic acid in 40 kilos of sulfuric acid (as it is directly obtained by the sulfurization of 12.3 kilos of nitrobenzene with 48 kilos of fuming sulfuric acid containing twenty-four per cent. of anhydrid) and 27.6 kilos of salicylic acid are then added and the whole while stirring heated from 90 to 100° C. After 12 to 15 hours the formation of the coloring matter is finished. The melt is poured into water, saturated with lime, the solution filtered and evaporated to dryness. The resulting calcium salt of the dyestuff forms a dark violet powder, very soluble in water with a bluish red color turning into orange when acidulated and into red violet by addition of caustic soda lye. It dyes wool from an acid bath in yellowish red shades which by aftertreatment with a chromate change into a violet.

Having now described my invention what I claim is—

1. The process for the production of coloring matters of the triphenylmethane series by condensing the hereinbefore defined orthosulfo-benzaldehydes in presence of sulfuric acid with aromatic orthooxy-carbonic acids and by subsequently oxidizing the thus produced leuco compounds by means of a solution of sodium nitrite in concentrated sulfuric acid.

2. The process for the production of coloring matters of the triphenylmethane series by condensing the hereinbefore defined orthosulfo-benzaldehydes in presence of concentrated sulfuric acid with orthocresotinic acid and by subsequently oxidizing the thus produced leuco compounds in the same solution of sulfuric acid by means of nitrosyl sulfuric acid.

3. The process for the production of coloring matters of the triphenylmethane series by condensing the hereinbefore defined orthosulfo-benzaldehydes in presence of concentrated sulfuric acid with ortho-cresotinic acid and by oxidizing the thus produced leuco compounds by means of a solution of a body containing an oxid of nitrogen in sulfuric acid.

4. As new articles of manufacture the coloring matters obtainable as described from the hereinbefore defined orthosulfo-benzaldehydes and aromatic orthoöxy-carbonic acids which dyestuffs are in the shape of their free sulfonic acids from bright red to reddish brown powders, soluble in acidulated water with an orange, in diluted caustic soda lye with a violet-color dyeing wool from acid bath bright red which shades by aftertreatment with bichromate change into a beautiful blue violet, and yielding the same blue violet shades when printed on cotton with a chrome salt.

5. As new article of manufacture the coloring matter obtainable as described from the orthosulfo-benzaldehyde and ortho-cresotinic acid, which dyestuff is in the shape of its free sulfonic acid a bright red powder soluble in acidulated water with an orange, in diluted caustic soda lye with a violet color, dyeing wool from acid bath bright red which shades by aftertreatment with bichromate change into a beautiful blue-violet, and yielding the same blue-violet shades when printed on cotton with a chrome salt.

In testimony whereof I have signed this specification in the presence of two subscribing witnesses.

ALFRED CONZETTI.

Witnesses:
 GEO. GIFFUDY,
 CHARLES KOECHLIN